United States Patent
Boehm et al.

[11] Patent Number: 5,297,471
[45] Date of Patent: Mar. 29, 1994

[54] HOUSING FOR A PNEUMATIC POWER BOOSTER AND PROCESS FOR ITS MANUFACTURE

[75] Inventors: Peter Boehm, Friedrichsdorf; Wilfried Wagner, Huttenberg-Weidenhausen; Lothar Schiel, Hofheim; Manfred Ruffer, Sulzbach; Ralf Jakobi, Liederbach; Kai-Michael Graichen, Langen; Lothar Mattheis, Frankfurt am Main, all of Fed. Rep. of Germany

[73] Assignee: Alfred Teves GmbH, Frankfurt am Main, Fed. Rep. of Germany

[21] Appl. No.: 861,829

[22] PCT Filed: Sep. 24, 1990

[86] PCT No.: PCT/EP90/01616
§ 371 Date: Aug. 28, 1992
§ 102(e) Date: Aug. 28, 1992

[87] PCT Pub. No.: WO91/09761
PCT Pub. Date: Jul. 11, 1991

[30] Foreign Application Priority Data
Dec. 21, 1989 [DE] Fed. Rep. of Germany ....... 3942211

[51] Int. Cl.$^5$ ............................................. F01B 19/00
[52] U.S. Cl. .................................. 92/98 R; 92/169.1; 91/369.1; 29/510; 29/513
[58] Field of Search ................ 92/96, 98 R, 99, 169.1; 91/369.1, 376 R; 403/281, 274; 29/509, 513, 515, 516, 510, 451

[56] References Cited

U.S. PATENT DOCUMENTS

| | | | |
|---|---|---|---|
| 3,732,616 | 5/1973 | Masrrodonato et al. | 29/510 |
| 4,604,944 | 8/1986 | Tsubouchi | 92/98 R |
| 5,074,024 | 12/1991 | Gautier | 29/513 |
| 5,195,421 | 3/1993 | Shinohara et al. | 91/376 R |

Primary Examiner—Thomas E. Denion
Attorney, Agent, or Firm—Robert P. Seitter; J. Gordon Lewis

[57] ABSTRACT

A construction and fabrication process for a two piece vacuum brake power booster housing is described which eliminates the surface tensions which are caused by forming during assembly to prevent damage to a protective surface finish. Localized radially weakened zones are each formed by two opposing tongues created by circumferential and axial slots which tongues in the assembled condition of the housing engage behind an outwardly and reversely formed rim (3) of the other housing half (1).

11 Claims, 2 Drawing Sheets

HOUSING FOR A PNEUMATIC POWER BOOSTER AND PROCESS FOR ITS MANUFACTURE

BACKGROUND OF THE INVENTION

The invention is related to a housing for a pneumatic power booster of a type comprised of a first and a second bowl shaped housing half which are coated with a protective surface finish. The housing halves are assembled with their open sides facing each other and telescoped one into the other and permanently fixed to each other. The first housing half has a rim which is bent out and back reversely and the second housing half is formed with an edge of a preferably cylindrical configuration. An elastic diaphragm is compressed between the housing halves to create a seal. The diaphragm comprises a movable wall dividing the inner space of the housing into two pneumatic chambers. The edge of the second housing half is formed with a plurality of uniformly distributed circumferential slots having portions which are parallel to the cylindrical edge and to the bent-over rim of the first housing half, so that localized zones weakened in the radial direction are formed.

This invention is also concerned with a process for manufacture of this type of housing.

A housing of this kind and a process for its manufacture are described in European patent application EP-A-0 300 857. The housing half having the cylindrical edge is formed about its edge with a plurality of circumferential slots which are symmetrically distributed about its circumference and preferably have an oval or rectangular shape, and which, with the outer edge of the cylindrical edge, define web-like zones weakened in the radial direction, which upon the two housing halves being telescoped one into the other are pressed in in such a way that their center portions move away in an axial direction from a plane running parallel to the bent-over rim of the other housing half through the end points of the webs. In this manner, the risk of corrosion is largely eliminated in particular along the connecting seam of the two housing halves.

In the prior-art pneumatic power booster, the extremely high surface tension which occurs due to the pressing-in of the webs in particular in their central portions, on the inside and on the outside, may lead to damaging of the applied protective coating layer. Those portions which are no longer protected against corrosive attack, are subjected to a considerable axial stress especially during operation of the power booster, and thus are particularly subject to corrosive attack and can, upon an extended service period, cause the failure of the power booster.

It is, therefore, the object of the present invention to provide a coupling of the two housing halves of a pneumatic power booster which does not result in areas of high surface tension.

SUMMARY OF THE INVENTION

According to the invention, this object is achieved in that the radially weakened zones are each formed by two tongues which are positioned opposite each other and which in the assembled condition of the housing engage behind the reversely formed rim of the other housing half in an axial direction.

According to the process, axial slots are formed extending into respective circumferential slots such as to create two tongues disposed opposite each other along each circumferential slot, extending in the circumferential direction.

Subsequently, the two housing halves are provided with a protective coating. The radially outer perimeter of the elastic diaphragm is compressed by pressing the two housing halves together in such a way that a slight axial clearance is created between the internal sides of the tongues and the reversely formed rim of the other housing half. The two tongues are simultaneously bent inwardly in the radial direction and afterward the axial force pressing the two housing halves together is relieved, so that the housing assumes its final assembled condition.

DETAILED DESCRIPTION

Figure 1:
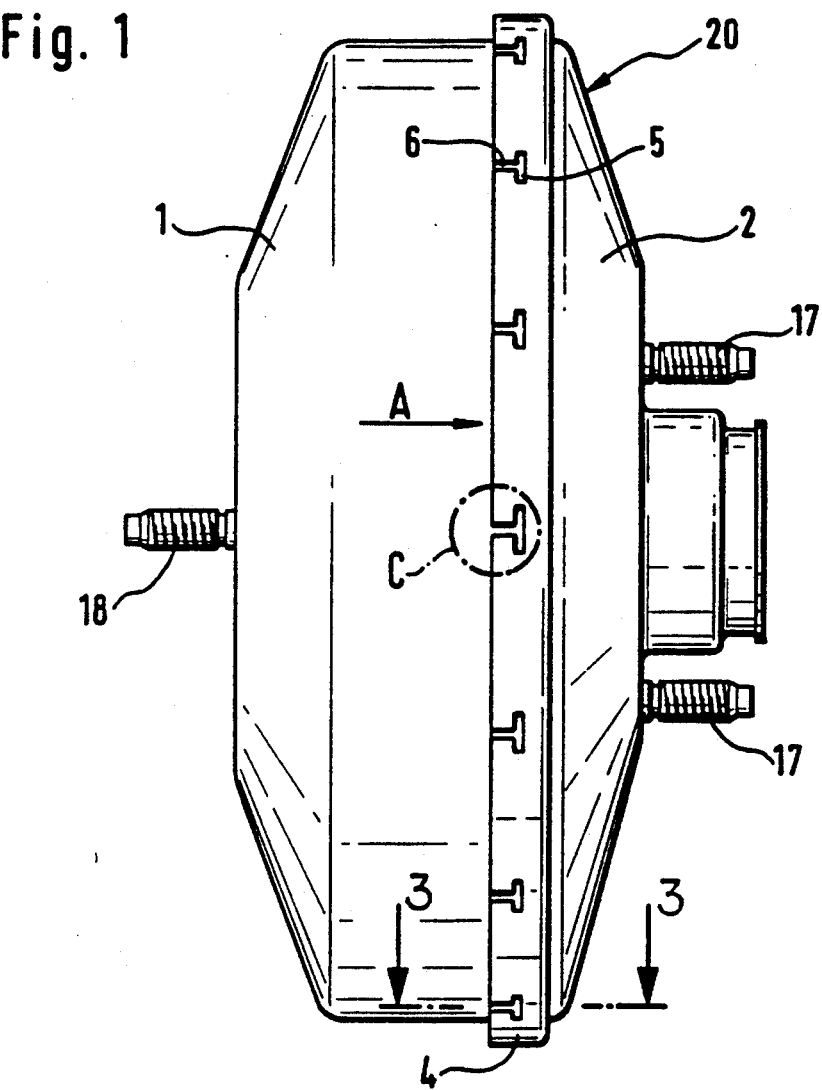
FIG. 1 is a side elevational view of a housing of a pneumatic power booster which is assembled in the manner according to the present invention.

The housing 20 shown in FIG. 1 of a pneumatic power booster, preferably of a vacuum brake power booster, is comprised of a first and of a second housing half 1 and 2 which are bowl shaped preferably made by the deep-drawing process of sheet or plate material, thereafter coated with a protective finish. The two housing halves 1, 2 are assembled together with their open sides telescoped together and thereafter permanently fixed in this assembled condition.

The housing half 2 which is shown on the right in FIG. 1 is provided with mounting studs 17, and has a cylindrical edge 4 which receives a reversely formed rim 3 (FIG. 3) of the housing half 1 shown on the left. The housing half 1 is furnished with studs 18 for mounting a master brake cylinder, not shown in the drawing.

The outer perimeter of a flexible diaphragm 9 (FIG. 3) is clamped in between the two open sides of the housing halves 1, 2. Jointly with a metal diaphragm retainer which is not shown in the drawing, the diaphragm 9 constitutes a movable wall which subdivides the interior space of the housing into two pneumatic chambers for the well known function of providing brake power boosting.

The cylindrical edge 4 of the righthand housing half 2 is formed with a plurality of openings or circumferential slots 5 which are uniformly distributed around its circumference, and which with its outer edge define localized zones of lower or weakened mechanical resistance in a radial direction. The edge 4 is also interrupted by axial slots 6 extending at right angles to the longitudinal axis of the slots 5 and extending into the slots. Thus two tongues 7, 8 (FIG. 2) are formed which are positioned opposite each other in a circumferential direction and which are bent in behind the reversely formed rim 3 of the lefthand housing half 1 in the assembled condition of the housing 20 (FIG. 3).

Figure 2:
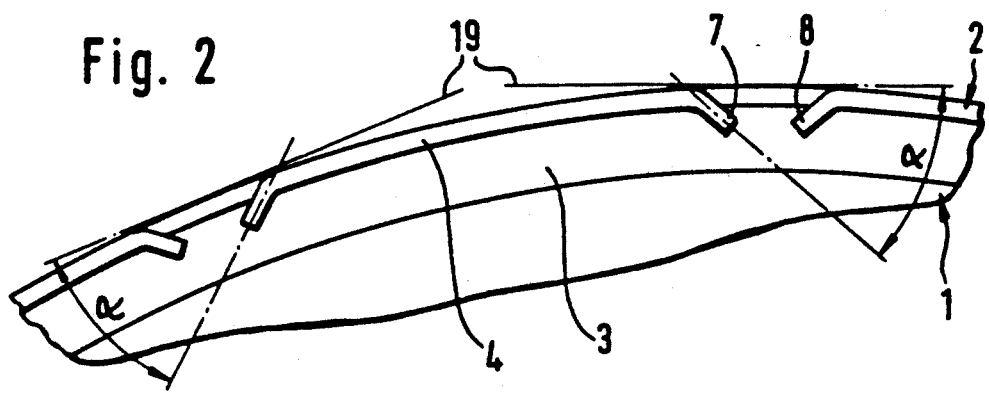
FIG. 2 is a view from the direction "A" in FIG. 1 in an enlarged fragmentary representation.
Figure 3:
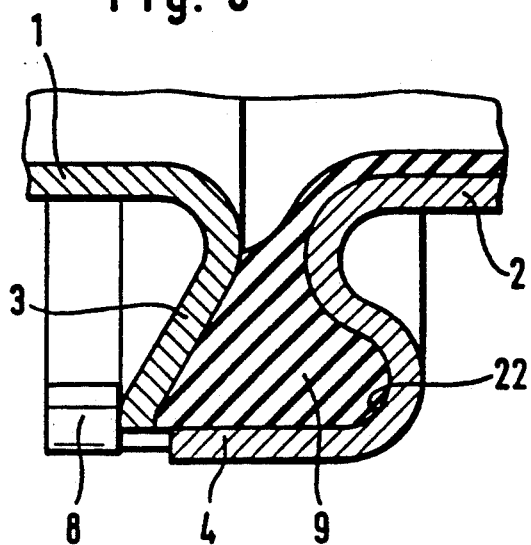
FIG. 3 is an enlarged view of the cross section taken along the line "3—3" in FIG. 1.

As is revealed, in particular, by FIG. 2, the tongues 7, 8 extend radially inwardly, and preferably in such a manner that with a circumferential plane 19 containing the axis of the slot 6, they form an acute angle X that ranges between 10 degrees and 90 degrees.

Figure 4:
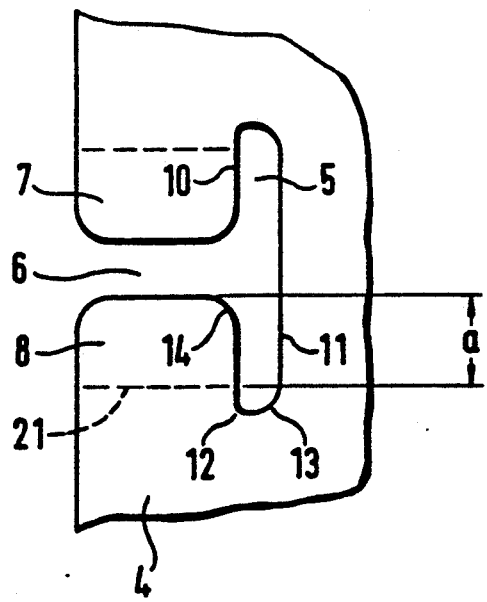

As will be seen from FIG. 4, in a first embodiment of the invention, the circumferential slots 5, and the tongues 7, 8 are defined by two straight slot sides 10, 11 extending parallel in a circumferential direction and spaced from each other. The slot sides 10,11 are connected with each other through two circular arcs 12, 13 of different radiuses which are blended into each other at the end of the slot 5. In this configuration, the arrangement is preferably selected such that the circular arcs 12 at the corner formed by the slots 5 and the sides 10 which define the tongues 7, 8 has a smaller radius.

In order to substantially eliminate a sharp corner on the tongues 7, 8 which comes in contact with the reversely formed rim 3 of the first housing half 1, a radius 14 is provided between the sides of the tongues 7, 8 defining the slot 6, on one hand, and the slot side 10, on the other hand.

In order to avoid the formation of cracks in the sheet or plate metal material and in the protective coating which cracks have a tendency to occur during bending-over of the tongues 7, 8, the tongues 7, 8 are bent over during the assembly along a line 21 being represented by a dashed line in FIG. 4 which runs at a distance "a" parallel to the plane of the side of the tongues 7, 8 which defines the slot 6, which distance is less than the remaining width of the slot 5.

Figure 5:
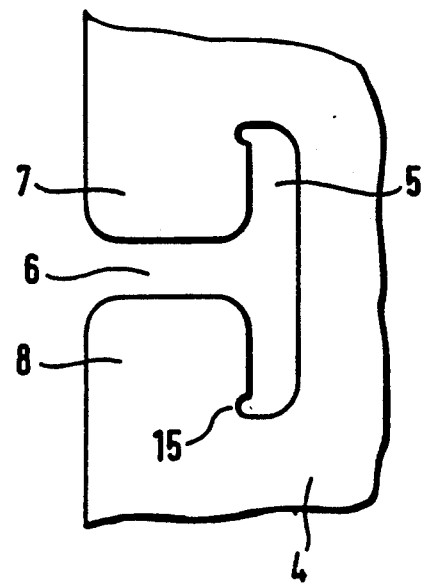
FIGS. 4 to 6 are greatly enlarged fragmentary views of detail "C" in FIG. 1, depicting respectively three different embodiments.
Figure 6:
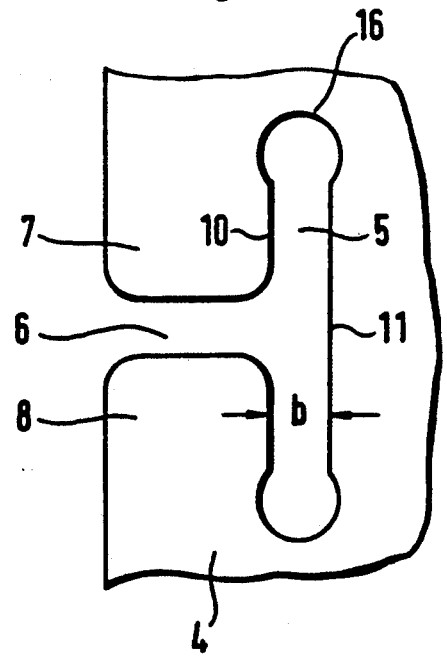

Further possibilities of relieving the region which is stressed most when bending the tongues 7, 8 are shown in FIGS. 5 and 6. In the second design variant of the invention which is illustrated in FIG. 5, the circular arc 12 having a smaller radius, which is mentioned in connection with the design according to FIG. 4, is replaced by a relief 15 having a semi-circular cross section which reduces to a minimum the material tension occurring at this point during bending-over.

Another possibility to eliminate the mentioned material tension is shown in a third embodiment illustrated in FIG. 6. In this variant, the circumferential slots 5 are defined in circumferential direction by circular arcs 16 formed at each end of the slot 5, whose effect is comparable to that of the reliefs 15 according to FIG. 5. The radius of the circular arcs 16 whose central angle ranges between 240 degrees and 310 degrees is preferably larger than the axial distance "b" between the two straight sides 10 and 11 which define the slots 5.

Now, in order to be able to create a permanent coupling between the two housing halves 1 and 2, the cylindrical edge 4 of the second housing half 2, and the tangential slots 5 with the axial slots 6 are first formed as by a punching or milling operation. Thereafter, the second housing half 2 is coated.

Subsequently, the radially outer sealing perimeter of the flexible diaphragm 9 is inserted into an annular groove 22 being defined in the second housing half 2 by the cylindrical edge 4 and the first housing half 1 which had been previously coated is pushed into the second housing half 2, the reversely formed rim 3 coming to be abutted in an axial direction against the sealing perimeter of the diaphragm 9.

A further assembly step consists in that the open sides of the two housing halves 1, 2 are telescoped one into the other and are pressed together to compress the sealing perimeter of the diaphragm, until a slight axial clearance has been generated between the straight sides 10 forming the axially inward boundary of the tongues 7, 8 and the reversely formed rim 3 of the first housing half 1. In this way, it is safeguarded that the coated surface of the reversely formed rim 3 cannot be scratched during the subsequent bending-over of the tongues 7, 8 in radially inward direction.

The bending in of the two tongues 7, 8 takes place simultaneously by introducing an appropriately configured lancing knife at right angles to the plane of the slots 5,6. Thereupon, the force pressing the two housing halves 1, 2 together is relieved, so that the housing 20 can assume its axial operating position in which the reversely formed rim 3 of the first housing half 1 comes to be abutted against the axially inside lateral sides 10 of the tongues 7, 8 under the effect of the elastic prestress of the sealing perimeter of the diaphragm 9. The assembly operation is then finished.

We claim:

1. A housing defining an inner space of a pneumatic power booster, comprised of a first and a second open sided bowl shaped housing half, each of which having a protective surface finish, the open side of each of said housing half telescoped one into the other and fixed to each other, the open side of said first housing half formed with a rim which is formed reversely and outwardly, the open side of said second housing half having a cylindrical edge, an elastic diaphragm having a perimeter retained between said open sides of said housing halves which serves to seal a movable wall formed by said diaphragm and dividing said inner space of said housing into two pneumatic chambers, said edge of said second housing formed with a plurality of uniformly distributed circumferential slots running parallel and adjacent to said edge, creating radially weakened zones, each of said circumferential slots defined by axially spaced apart slot sides and radiused slot ends connecting said spaced apart sides, said slot sides and slot ends of each said radially weakened zones having two opposing tongues formed by an axial slot extending from said edge into the associated circumferential slot, said tongues defined by material intermediate one side of said circumferential slots and said edge, said tongues angled radially inwardly behind said formed rim of said first housing half and engaging said rim to retain said first and second halves together in an axial direction.

2. A housing as claimed in claim 1 wherein said tongues are angled radially inwardly at an angle ranging between 10 degrees and 90 degrees from a circumferential plane of said associated slot.

3. A housing as claimed in claim 2 wherein said tongues (7, 8) have a rounded configuration at the intersection of said axial and circumferential slots.

4. A housing as claimed in claim 1 wherein said slot sides are joined by pairs of circular arcs of different radiuses at each of said slot ends of each circumferential slot, one of said circular arcs adjacent said tongues having a smaller radius.

5. A housing according to claim 4, wherein each slot end of said circumferential slots is defined by a circular arc whose radius is larger than the axial distance between said straight sides, subtending an arc in a range between 240 degrees and 310 degrees.

6. A housing as claimed in claim 4, wherein said circular arcs form a radiused relief at the root of each tongue adjacent said slot.

7. A process for the manufacture of a housing for a pneumatic power booster, which is comprised of two open sided, bowl shaped housing halves, the open sides of which are telescoped one into the other and are fixed to each other, a first housing half having a rim about the open side thereof which is formed reversely an outwardly and a second housing half having an edge about the open side thereof of a substantially cylindrical configuration, and an elastic diaphragm having a perimeter compressed between said rim and edge respectively of said first and second housing halves, said edge formed with a plurality of uniformly distributed circumferential slots, each having parallel spaced apart sides and curved slot ends connecting said slot sides, said circumferential slots extending parallel and adjacent to said edge, so that localized radially weakened zones are formed, said process comprising the steps of:

fabricating a series of axial slots extending in from said edge of said second housing into each of said circumferential slots in such a manner that two oppositely extending tongues are formed defined by the material between said circumferential slot and said edge;

applying a protective surface finish on both housing halves including surfaces defining said circumferential and axial slots;

pressing said open sides of said two housing halves together so that the radially outer perimeter of said elastic diaphragm is simultaneously compressed therebetween, so that a slight axial clearance is created between the internal side of each of said tongues and said rim of said first housing;

bending said tongues radially inwardly; and, releasing said two housing halves, so that said housing halves move axially apart slightly to assume an assembled position with said rim against said tongues.

8. A process as claimed in claim 7, wherein said step of bending of said two tongues comprises the step of moving a tool against said tongues acting at right angles to the plane of said tongues.

9. A process as claimed in claim 7, wherein said step of forming said slots includes the step of punching said slots in said edge.

10. A process as claimed in claim 7, wherein the step of forming said slots comprises the step of milling said slots in said edge.

11. A process as claimed in claim 7, wherein the step of bending said tongues comprises the step of bending said tongues radially inwardly along a line which runs at a distance parallel and spaced from the end of said circumferential slot from the adjacent side of said axial slot.

* * * * *